United States Patent
Lin

(10) Patent No.: US 7,114,218 B1
(45) Date of Patent: Oct. 3, 2006

(54) HINGE DEVICE FOR A FLAT PANEL DISPLAY

(75) Inventor: Kuan Li Lin, Fongshan (TW)

(73) Assignee: Jiin Ming Industry Co., Ltd., Taoyuan (TW)

( * ) Notice: Subject to any disclaimer, the term of this patent is extended or adjusted under 35 U.S.C. 154(b) by 51 days.

(21) Appl. No.: 11/208,875

(22) Filed: Aug. 22, 2005

(51) Int. Cl.
*E05C 17/64* (2006.01)
(52) U.S. Cl. .......................... 16/342; 16/339
(58) Field of Classification Search ................. 16/342, 16/374, 330, 337–340, 54; 361/683, 803; 248/917, 919–923; 269/82–85
See application file for complete search history.

(56) References Cited

U.S. PATENT DOCUMENTS

| | | | | |
|---|---|---|---|---|
| 1,453,901 A | * | 5/1923 | Andersen | 269/45 |
| 2,565,999 A | * | 8/1951 | Teglas et al. | 269/73 |
| 2,991,994 A | * | 7/1961 | Kulp | 269/84 |
| 5,419,013 A | * | 5/1995 | Hsiao | 16/319 |
| 5,664,286 A | * | 9/1997 | Sorimachi | 16/54 |
| 6,018,847 A | * | 2/2000 | Lu | 16/337 |
| 6,085,384 A | * | 7/2000 | Bivens | 16/54 |
| 6,101,676 A | * | 8/2000 | Wahl et al. | 16/342 |
| 6,378,830 B1 | * | 4/2002 | Lu | 248/278.1 |
| 6,671,927 B1 | * | 1/2004 | Chen | 16/339 |
| 2003/0121124 A1 | * | 7/2003 | Chen | 16/339 |
| 2005/0102796 A1 | * | 5/2005 | Lee et al. | 16/342 |
| 2005/0108854 A1 | * | 5/2005 | Lee et al. | 16/340 |

FOREIGN PATENT DOCUMENTS

TW          91213523          8/2002

* cited by examiner

*Primary Examiner*—Chuck Y. Mah
*Assistant Examiner*—Mark T. Vogelbacker

(57) ABSTRACT

A hinge device for a flat panel display which is able to be adjusted and retained at any desired angle, comprises a fixed unit and a pivotal unit, wherein the fixed unit has a base, a pair of supports, a pair spindles and a pair of bushings mounted around the spindle, the pivotal unit includes a mounting part integrated with two pivotal bearing parts, two pair of bearing blocks respectively mounted around the bushings and a connecting member, a plurality of annular grooves being defined around an aperture defined in a center of the bearing blocks corresponding to the plurality of the annular ribs formed around the external surface of the bushing, thereby the pivotal unit is able to be retained at any desired angle by the friction between the contacting surfaces of the bearing blocks and the bushing.

8 Claims, 3 Drawing Sheets

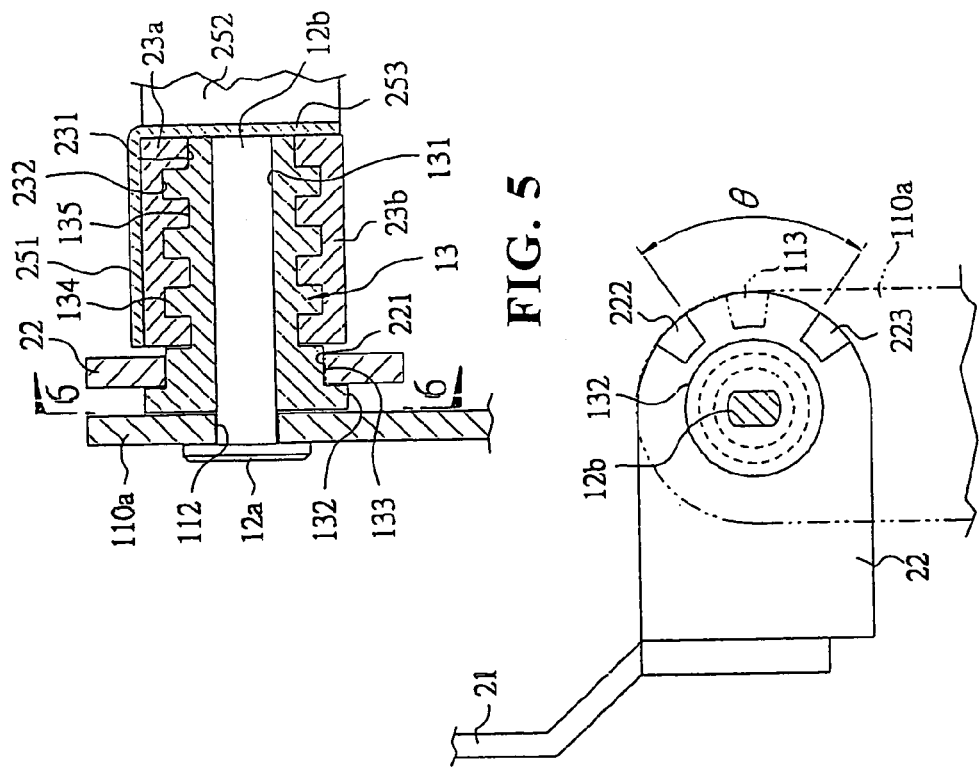
FIG. 5
FIG. 6
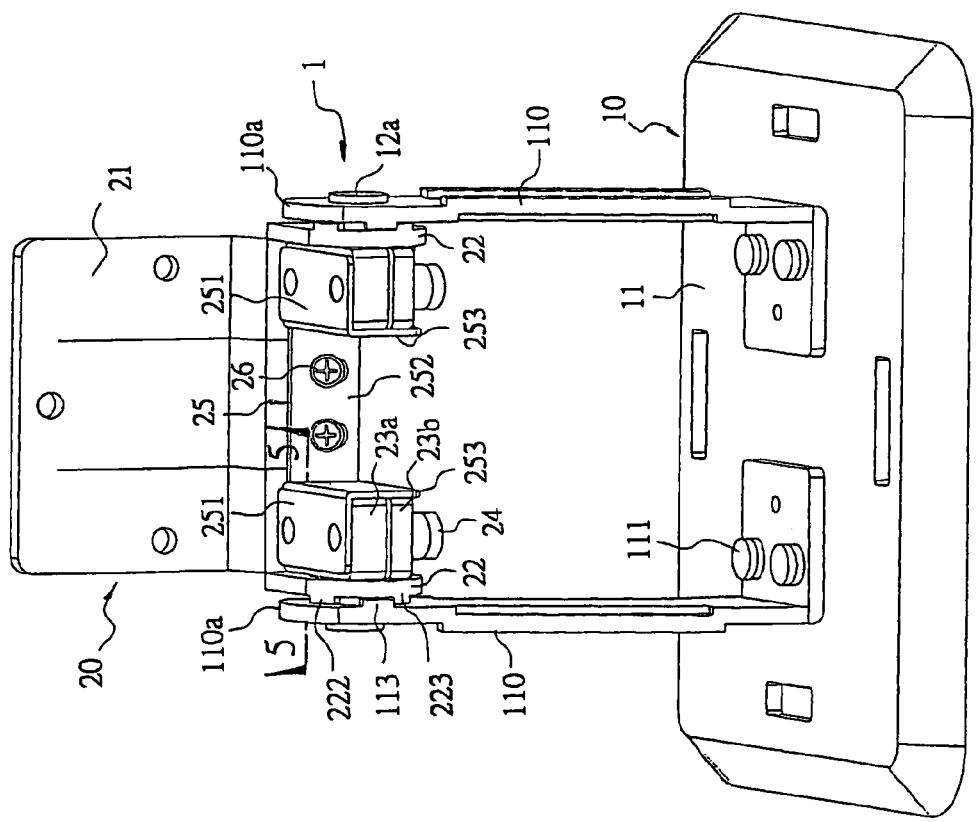
FIG. 4

HINGE DEVICE FOR A FLAT PANEL DISPLAY

BACKGROUND OF THE INVENTION

1. Field of the Invention

The present invention relates to a hinge device for a flat panel display, and more particularly to a novel hinge device, which enables the display panel to be adjusted and retained at any desired angle.

2. Description of Related Art

As known in the art, common flat panel displays such as liquid crystal display (LCD), and thin-film transistor (TFT) liquid crystal display etc. are widely used incorporating with PC personal computers or NB notebook computers or the likes due to its lightweight and small thickness and small size properties. A known hinge device used between a display panel and a pedestal base generally comprises a spindle extending through connecting parts respectively provided at pivotal ends of the display panel and the base, and disc washers and screw nuts mounted around the spindle, whereby a friction is produced while the display panel pivots with respect to the base. Alternatively, the display panel of a NB computer may also be retained at any angle by a friction produced by means of a hinge device employing tight fit between a sleeve and a spindle. However, it can be understand that the friction between the display panel and the pedestal base of the Notebook (NB) computer tends to be reduced after having been used for a long time, and external contacting surface of the metal-made spindle and corresponding internal contacting surface of the plastic sleeve may be grinded, whereby the positioning of the display panel may lose balance.

A prior art as shown in FIGS. 1a and 1b illustrates a hinge device (1), which is mounted with a connecting supporter secured at a backside of an LCD display panel. The hinge device (1) generally comprises a connecting member (10), a spindle (20), a pair of retaining plates (30), a pair of supporting units (40), a pair of internal springs (50), a pair of external springs (60) and a pair of screw nuts (70).

The connecting member (10) has a connecting portion (11) formed at one end thereof to connect with the connecting supporter, and a fitting portion (12) with a fitting hole (13) defined therein formed at the other end of the connecting member (10).

The spindle (20) has a middle portion fitted in the corresponding fitting hole (13) and two opposite end portions respectively formed with two thread portions (211, 221).

The pair of retaining plates (30) are respectively defined with two central holes (31) and mounted around the opposite end portions of the spindle (20), each retaining plate (30) having a first retaining indentation (32), a second retaining indentation (33), a first positioning recess (34), and a second positioning recess (35) defined therein.

Each one of the pair of supporting units (40) has an upright portion (41) securely fixed on the backside of the display panel, and a horizontal portion (42) defined with a central hole (421) and mounted around one of the opposite ends of the spindle (20) at outside of the retaining plate 30. Each horizontal portion (42) includes a fixing hole (422) defined at one side adjacent the central hole (421), a recess (423) defined at an upper end thereof, and a positioning piece (424) formed at a lower end thereof extending inwards and passing through the second retaining indentation (33).

The interior springs (50) are torsional springs and respectively mounted around the opposite ends of the spindle (20) between the corresponding connecting members (10) and the retaining plates (30), wherein each one of the spring (50) has a first end (51) thereof biased against the connecting portion (11) of the connecting member (10), and a second end (52) thereof disposed in the second positioning recess (35).

The exterior springs (60) are also torsional springs mounted around the opposite ends of the spindle (20) at outsides of the supporting units (40) respectively. A first end (61) of the exterior springs (60) is inserted into the securing hole (422) of the horizontal portion (42) of the supporting unit 40. A second end (62) of the exterior springs (60) is extended through the recess (423) defined in the horizontal portion (42) of the supporting unit (40) and inserted into the first positioning recess (34) of the poison-limited plate (30).

The screw nuts (70) are threadingly engaged around the thread portion (211, 221) at the opposite ends of the spindle (20), respectively, and press against the outsides of the exterior torsion springs (60).

In the perfect working status, a liquid crystal display with the hinge device as described above is able to be adjusted and retained at any desired angle, due to the design of the cooperation between the interior and exterior springs and the retaining plates provided at the opposite sides. The support unit is also completely supported at the backside of the LCD, so as to minimize the size. However, the structure of the above described hinge device of the prior art is complicated with too many parts and accessories, i.e. the production cost of the hinge device is increased, and the possibility of trouble is also increased so that the technological level/cost is high.

Therefore, it is an objective of the invention to provide an improved hinge device for a flat panel display to mitigate and/or obviate the aforementioned problems.

SUMMARY OF THE INVENTION

The main object of the present invention is to provide a hinge device for a flat panel display, wherein the friction between a pivotal unit and a fixed unit is increased by means of a pair of separated bearing blocks enclosing an external surface of a bushing tightly, whereby the display panel is able to be retained at any desired angle, and meanwhile the structure of the hinge device is simplified.

In order to accomplish the above object and other objects, the hinge device in accordance with the present invention generally comprises a fixed unit, which includes a base and a pair of supports having lower ends thereof securely fixed on the base and upper distal ends thereof extending vertically upwards and respectively defined with two spindle bores, a pair of spindles respectively extending through from outside to inside of the spindle bores of the supports and kept from rotation, a pair of bushings having a spindle bore defined axially in centers thereof and respectively mounted around the spindles and kept from rotation, each one of the pair of bushings having a plurality of annular ribs formed around the external surface; and a pivotal unit, which includes a mounting part used to be mounted on a the display panel, a pivotal bearing portion integrated with the mounting part and perpendicularly extending from opposite sides of mounting part, each pivotal bearing portion having a pivotal hole defined in a center thereof to receive the bushing fitted therein, whereby the pivotal unit is able to rotate with respect to the bushing of the fixing unit about the axis of the pivotal hole; a pair of separating bearing blocks respectively mounted around the bushings, each one consisting of two half blocks and having an aperture defined therein corresponding to the external surface of the second end portion of the bushing, internal surface of the aperture being defined with a plurality of annular grooves corresponding to the plurality of annular ribs, the pair of two half bearing blocks clamp around the bushing exteriorly; a connecting plate comprising two connecting portions perpendicular to the each other being used to connect the pivotal unit and the bearing blocks by a plurality fastening means.

In accordance with the present invention, the pair of bushings may be made of plastic material by molding, or be made of aluminum, magnesium and the likes by die-casting, with a plurality of annular ribs formed around an external surface thereof to increase surface contact area. Similarly, the pair of bearing blocks may also be made of plastic material by molding, or be made up of aluminum, magnesium and the likes by die-casting, and correspondingly enclosing the external surface of the bushing tightly. The frictional contact area is increased due to the rugged surfaces between the bushing and the bearing blocks, therefore the pivoting and positioning between the pivotal unit and the fixed unit are more steady and reliable than that of the conventional hinge device employing frictional contact between a metal spindle and a plastic spindle sleeve. A further object of the present invention is to provide a hinge device having simplified structure and reduced production cost. Other objects, advantages and novel features of the invention will become more apparent from the following detailed description when taken in conjunction with the accompanying drawings.

BRIEF DESCRIPTION OF THE DRAWINGS

FIG. 1b is an assembly schematic view of the hinge device shown in FIG. 1a;

FIG. 4 is a perspective view showing the assembly of the hinge device in accordance with the present invention;

FIG. 5 is a partial cross-sectional view along a line 5—5 in FIG. 4; and

FIG. 6 is a partial cross-sectional view along a line 6—6 in FIG. 5.

DETAILED DESCRIPTION OF THE PREFERRED EMBODIMENT

The technical features of the present invention will be described further with reference to the embodiments. The embodiments are only preferable examples without limiting to the present invention. It will be well understood by the following detail description in conjunction with the accompanying drawings.

Figure 1A:
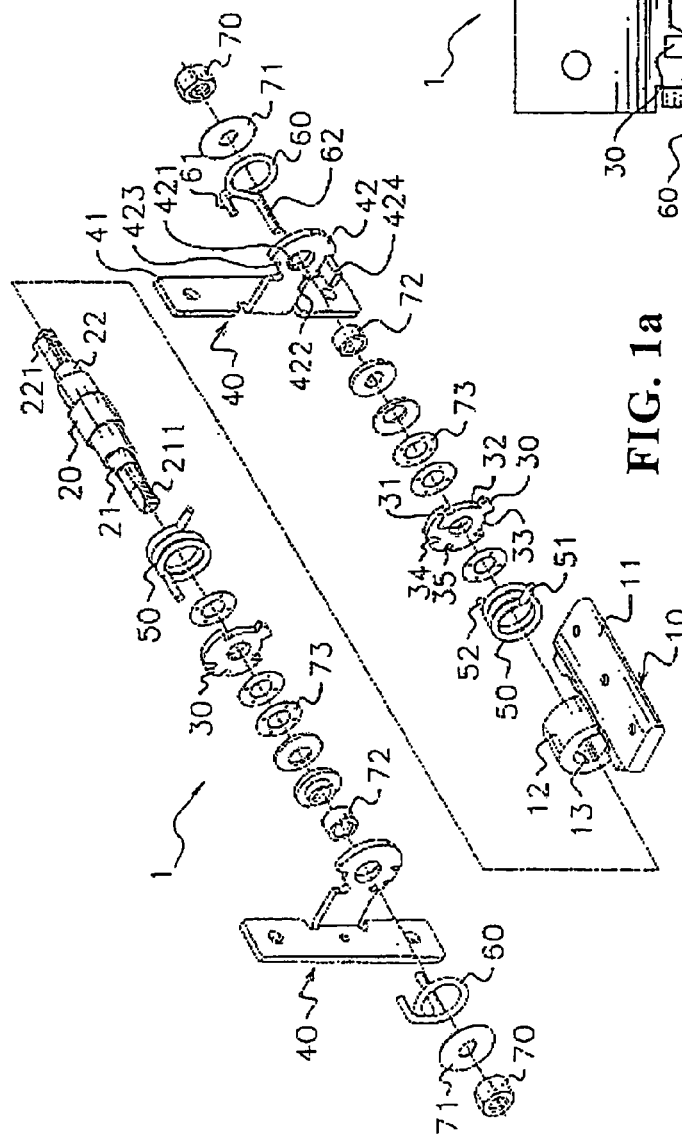
FIG. 1a is an exploded perspective view of a hinge device for a supporting frame of a liquid crystal display of a prior art.
Figure 1B:
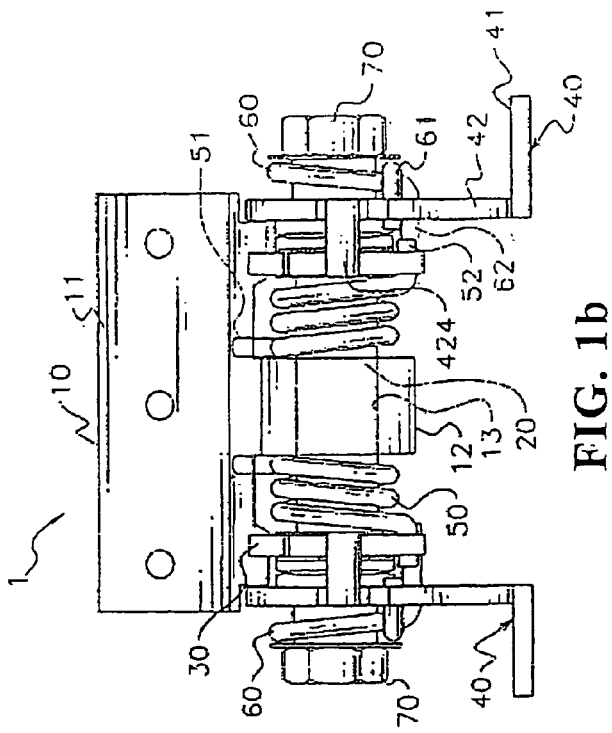
Figure 3:
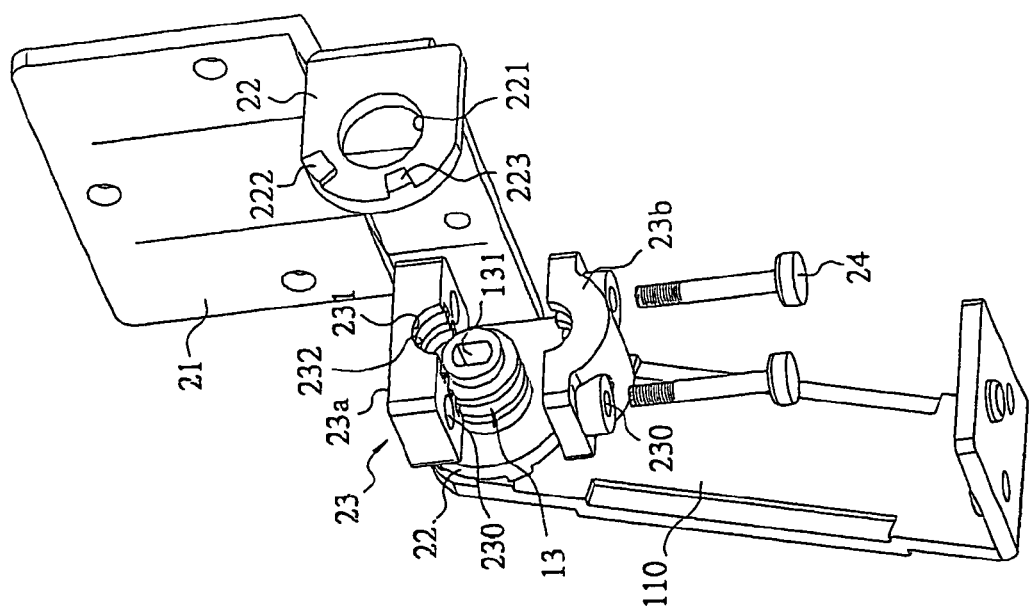
FIG. 3 is a partial exploded perspective view of the hinge device in accordance with the embodiment of the present invention.
Figure 2:
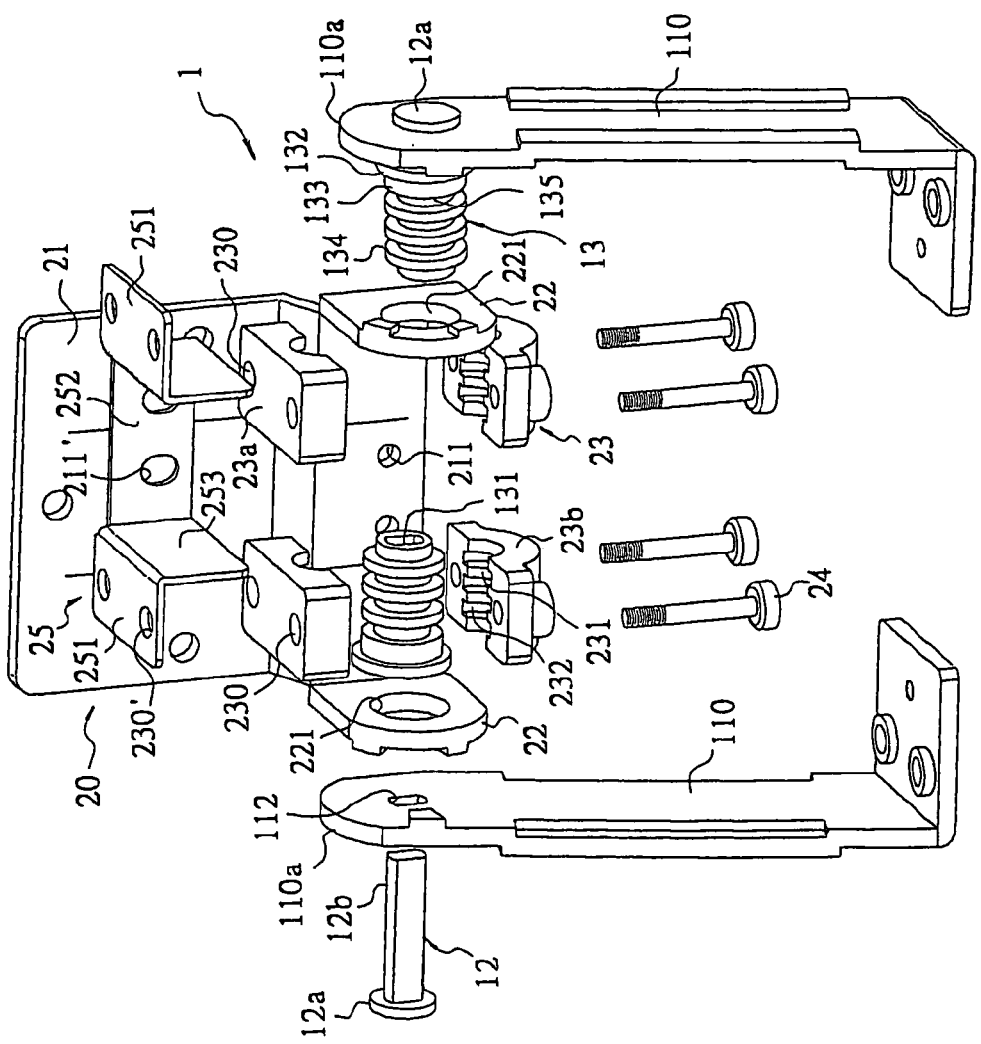
FIG. 2 is an exploded perspective view of a hinge device in accordance with one embodiment of the present invention, wherein a base is omitted.

With reference to FIGS. 2, 3 and 4, a hinge device (1) for a flat panel display according to the present invention is intended to be connected between a flat panel display and a base of the display monitor, such as a liquid crystal display monitor (LCD monitor), a liquid crystal display television (LCD TV), whereby the display panel is able to be adjusted and retained at any desired angles.

The hinge device (1) comprises a fixed unit (10) and a pivotal unit (20), wherein the fixed unit (10) includes a base (11) and a pair of supports (110), a pair of metal spindles (12), a pair of bushings (13), and the pivotal unit (20) includes a mounting part (21) integrated with two pivotal bearing parts (22), two pairs of bearing blocks (23) and a connecting member (25).

The base (11) of the fixed unit (10) in intended for supporting and weight-balancing. The pair of supports (110) have two lower ends thereof securely fixed on the base (11) by a plurality of fasteners, two upper distal ends (110a) thereof extending vertically upwards to a proper height. Two non-circular spindle bore (112) are respectively defined in center of the two upper distal ends (110a) of the supports (110).

The pair of metal spindle (12), each one of which has a first end (12a) formed with a head, and a second end (12b) shaped corresponding to the spindle bores (112). The pair of spindle (12) are respectively extended through from the outside of spindle bore (112) into the inside of the spindle bore (112) towards the middle of the hinge device (1), and kept from rotation due to the non-circular shape.

The bushings (13) have two non-circular spindle bores (131) respectively defined therein corresponding to the bolt (12). The second ends (12b) of the bolts 12 are respectively extending through the spindle bores (131) so that the bushings (13) are kept from rotation. The bushing (13) is formed with a head (132) and a shoulder (133) at a first end thereof, and also formed with a plurality of annular ribs (134) around an external surface (135) of a second end thereof.

The pivotal unit (20) comprises an integrated member having a first end thereof formed with the mounting part (21) to be used to be connected on a backside of a display panel (not shown), and a second end thereof with two pivotal bearing parts (22) perpendicularly extending from opposite sides thereof. Each pivotal bearing part (22) has a pivotal hole (221) defined therein to receive the shoulder (133) of the bushing (13) fitted therein. The heads (132) of the bushing (13) are respectively sandwiched between the pivotal bearing parts (22) and the distal ends (110a) of the supports (110).

Two pairs of separated bearing blocks (23) are respectively mounted around the bushings (13). Each one pair of bearing blocks (23) consisting of two halves, one upper block (23a) and one lower block (23b), is defined with an aperture (231) in a center thereof corresponding to the external surface (135) of the bushing (13). The internal surface of the aperture (231) has a plurality of annular grooves (232) defined there-around corresponding to the annular ribs (134) formed around the external surface (135) of the bushing (13). The pair of bearing blocks (23) further has two vertically extending thread holes (230) defined at opposite sides of the aperture (231), thereby the bushing (13) fitted in the aperture (231) is operatively mounted between the two bearing blocks (23) clamped by means of two threading rods (24) that are respectively threadingly engaged into the thread holes (230) of the blocks (23). The external surface (135) and the annular ribs (134) of the second end of the bushing (13) are correspondingly engaged with the aperture (231) and the grooves (232) of the bearing blocks 23, as shown in FIG. 5.

The connecting member (25) is integrally formed with a pair of first connecting portion (251), a second connecting portion (252) and two reinforced portions (253) which are perpendicular to the each other, wherein the first connecting portions (251) are respectively defined with two pairs of threading holes (230') corresponding to the threading holes (230) of the blocks (23), the second connecting portion (252) is defined with a plurality of threading holes (211') corresponding to a plurality of threading holes (211) defined in the mounting part (21) of the pivotal unit (20). The first connecting portions (251) are respectively connected with the bearing blocks (23) by means of the threading rods (24) respectively threading through the thread holes (230) of the bearing blocks (23) and threadingly engaged into the threading holes (230') of the connecting member (25). The second connecting portion (252) is fixed with the mount part (21) by means of a plurality of fasteners (26), which can be seen in FIG. 4.

As shown in FIG. 6, the pivotal unit (20) of the hinge device (1) according to the present invention is designed to be adjustable within an angle range of θ which is determined between an upper dead block (222) and a lower dead block (223) integrally formed on opposite external surfaces of the pivotal bearing parts (22). Two retaining blocks (113) are respectively formed on opposite internal surfaces of the supports (110) of the fixed unit (10), and disposed and limited between the upper dead block (222) and the lower dead block (223), whereby the pivotal unit (20) is able to pivotally move within the angle of θ. According to the present invention, the friction between the bearing blocks (23) and the bushing (13) may be varied by adjusting the threading rods (24) threadingly engaged with the bearing blocks (23), and may also be controlled by increasing or decreasing the number of the annular ribs of the bushing (13) and the corresponding number of the grooves (232) of the block (23).

As overall described herein before, since the contacting area of the bushing (13) is increased by the plurality of annular ribs (134), and the blocks (23) are made of plastic materials and tightly enclose the bushing (13), the frictional contacting area between the bushing (13) and the blocks (23) are increased by the rugged contacting surfaces of the same, whereby the display panel is able to be adjusted and positioned or retained at any desired angle, the structure of the hinge device (1) is simplified and the production cost is reduced, and advantageously, the pivotal unit (20) may be operative relative to the fixed unit (10) more steady and reliable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge device (1) for a flat panel display, comprising a fixed unit (10) and a pivotal unit (20), wherein the fixed unit (10) comprises a base (11), a pair of supports (110), a pair of spindles (12), a pair of bushings (13), and the pivotal unit (20) comprises a mounting part (21), two pivotal bearing parts (22) integrated with the mounting part (21), two pairs of bearing blocks (23) and a connecting member (25), wherein each one of supports (110) has a lower end thereof securely fixed on the base (11) and an upper distal end (110a) thereof extending vertically upwards, and each upper distal end (110a) of the supports (110) has a spindle bore (112) defined therein;

each one of the pair of spindles (12) has a first end (12a) thereof formed a head, and a second end (12b) thereof extending through from outside to inside of the spindle bore (112) towards a middle of the hinge device (1);

each one of the pair of bushings (13) includes a spindle bore (131) defined axially in a center thereof, and mounted around the external surface of the second end (12b) of the spindle (12) to be kept from rotation, the pair of bushing (13) having a first end thereof formed with a head (132) and a shoulder (133), and a second end portion thereof formed a plurality of projective annular ribs (134) at the external surface thereof;

the pivotal unit (20) has the mounting part (21) formed at a first end thereof to be used to mount on load, and the pair of pivotal bearing parts (22) extending perpendicularly from opposite sides of a second end thereof, each pivotal bearing part (22) having a pivotal hole (221) defined therein to receive the shoulder (133) of the bushing (13) fitted therein, the two pairs of separated bearing blocks (23) are respectively mounted around the second end of the bushing (13), each one of the two pairs of separated bearing blocks (23) consisting of an upper block (23a) and a lower block (23b) has an aperture (231) defined in a center thereof corresponding to an external surface (135) of the second end portion of the bushing (13), an internal surface of the aperture (231) being defined with a plurality of annular grooves (232) corresponding to the plurality of annular ribs (134), the pair of upper and lower blocks (23a, 23b) are tightly mounted around the external surface of the second end portion of the bushing (13) and clamped in combination by a plurality of threading rods (24);

the connecting plate (25) is integrally formed with a pair of first connecting portions (251) and a second connecting portion (252) perpendicular thereto, wherein the first connecting portions (251) is connected to the mounting part (21) of the pivotal unit (20) by the plurality threading rods (24), and the second connecting portion is connected to the bearing blocks 23 by a plurality fasteners (26).

2. The hinge device for the flat panel display as claimed in claim 1, wherein the spindle (12) has a non-circular cross section correspondingly to the spindle bore (112) defined in the distal end (110a) of the support (110).

3. The hinge device for the flat panel display as claimed in claim 2, wherein the spindle bore (131) defined in the center of the bushing (13) is a non-circular bore corresponding to the cross section of the spindle (12).

4. The hinge device for the flat panel display as claimed in claim 1, wherein the friction between the pivotal unit (20) and the bushing (13) is controllable by adjusting the threading rods (24) threadingly engaged in the bearing blocks (23).

5. The hinge device for the flat panel display as claimed in claim 1, wherein the friction between the pivotal unit (20) and the bushing (13) is controllable by increasing or decreasing the number of the annular ribs formed around the bushing (13) and the corresponding number of the annular grooves (232) defined in the blocks (23).

6. The hinge device for the flat panel display as claimed in claim 1, wherein each one of the pivotal bearing portions (22) of the pivotal unit (20) is formed with an upper dead block (222) and a lower dead block (223) at an external surface thereof.

7. The hinge device for the flat panel display as claimed in claim 6, wherein each one of the supports (110) of the fixed unit (10) has a retaining block (113) formed at an internal surface approximal the distal end (110a) thereof and being pivotally movable between the upper dead block (222) and the lower dead block (223).

8. The hinge device for a display as claimed in claim 1, wherein the connecting plate (25) comprises a reinforcement (253) perpendicular to the first connecting portion (251) and the second connecting portion (252).

* * * * *